United States Patent [19]

Lotz

[11] Patent Number: 4,527,777
[45] Date of Patent: Jul. 9, 1985

[54] FLAME-CUTTING MACHINE

[76] Inventor: Horst K. Lotz, Kiefernweg 13, 6200 Wiesbaden-Delkenheim, Fed. Rep. of Germany

[21] Appl. No.: 530,856

[22] Filed: Sep. 9, 1983

[30] Foreign Application Priority Data

Nov. 9, 1982 [EP] European Pat. Off. ......... 82108388.8
Mar. 29, 1983 [DE] Fed. Rep. of Germany ... 8309246[U]

[51] Int. Cl.³ .............................................. B23K 7/02
[52] U.S. Cl. ..................................................... 266/50
[58] Field of Search .......................................... 266/50

[56] References Cited

U.S. PATENT DOCUMENTS 4,042,224  8/1977  Zeley .................................... 266/50
4,303,227  12/1981  Dompas ................................ 266/50
4,385,750  5/1983  Hennecke ............................. 266/50

Primary Examiner—W. Stallard
Attorney, Agent, or Firm—Gifford, VanOphem, Sheridan, Sprinkle & Nabozny

[57] ABSTRACT

A flame cutting machine for dividing moving bars, particularly hot and cold billets, in continuous casting units during the casting operation. The flame cutting machine generally comprises a double jacket through which a cooling medium flows and through which bearing eyes for the shafts of the rotors are welded. The double jacket has two U-shaped shells arranged concentrically with branches of the inner shell extending further upward than the branches of the outer shell. In addition, a lengthwise closing plate extends from the outer shell to the inner shell.

20 Claims, 29 Drawing Figures

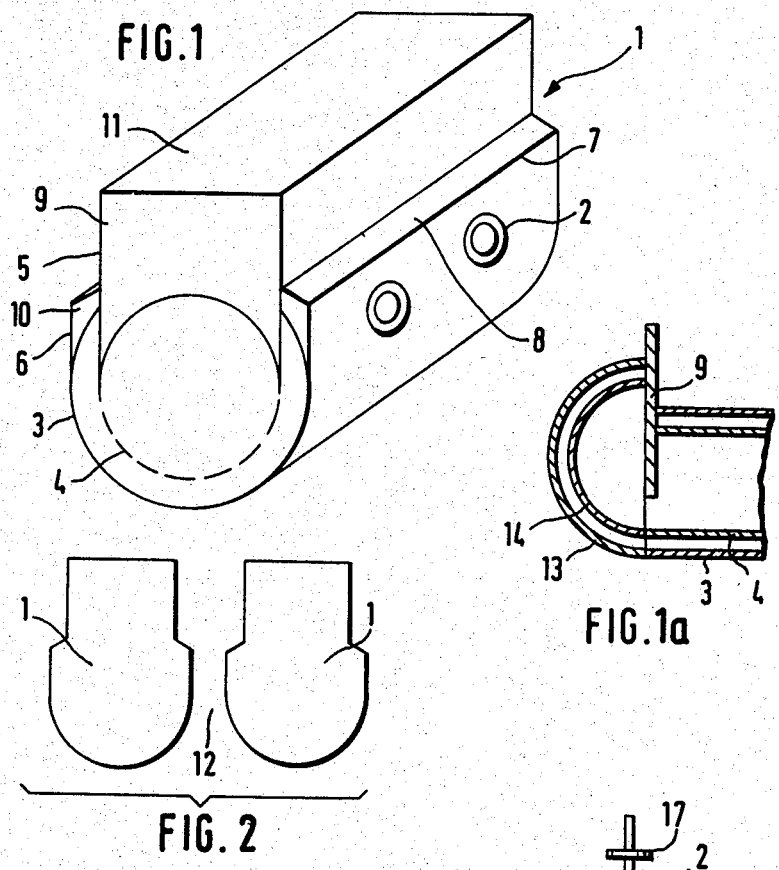
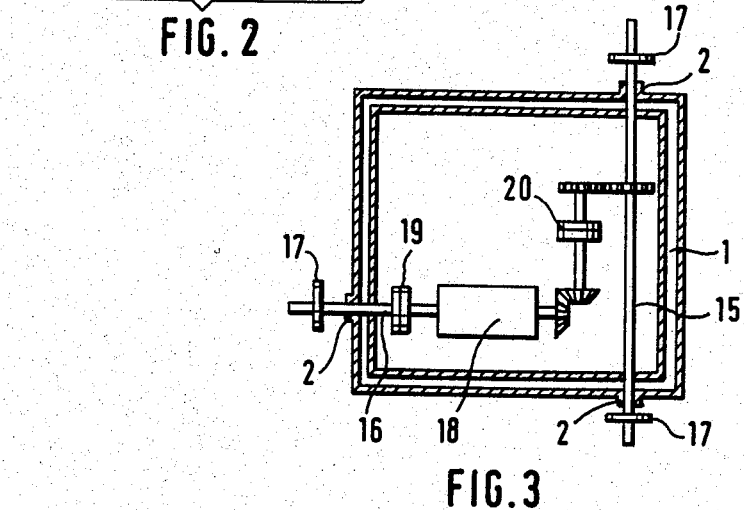

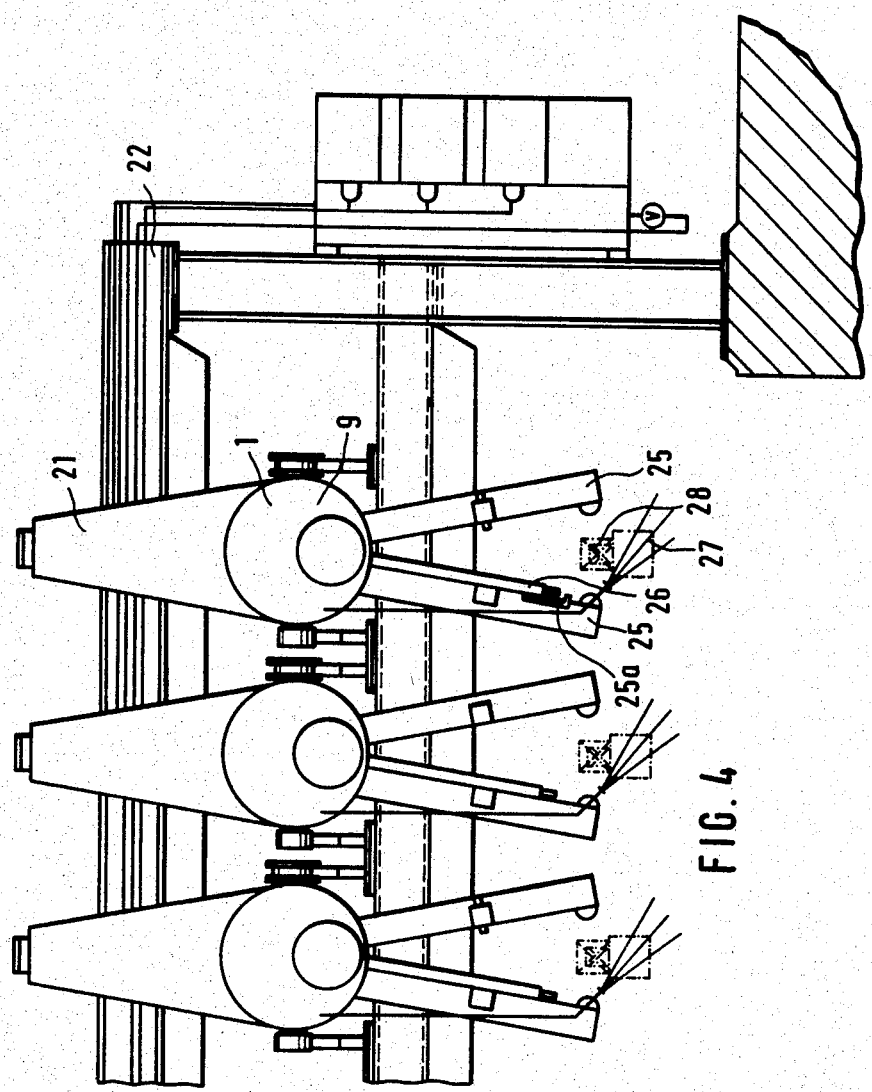

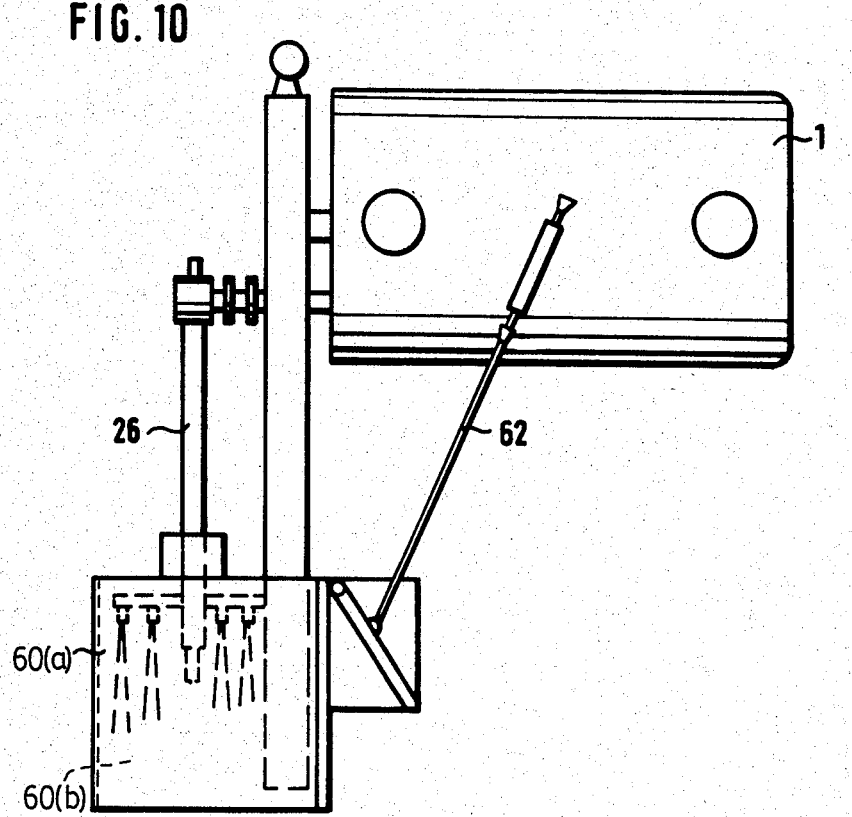

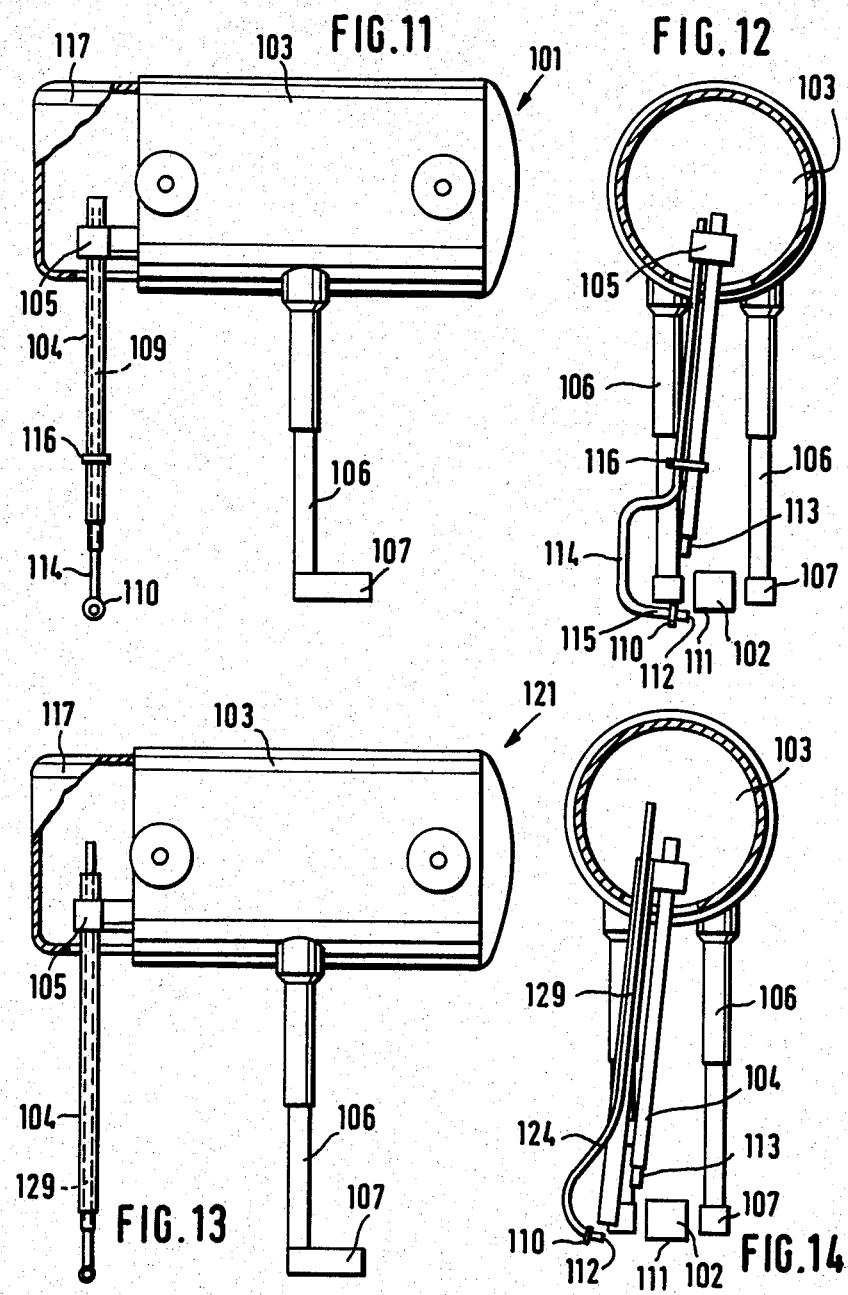

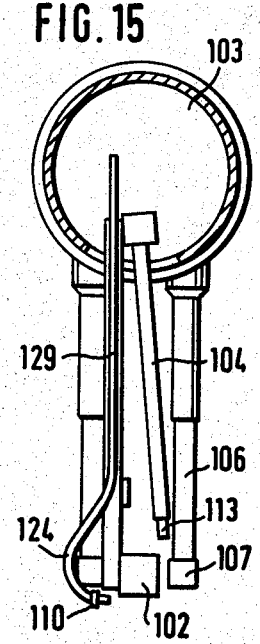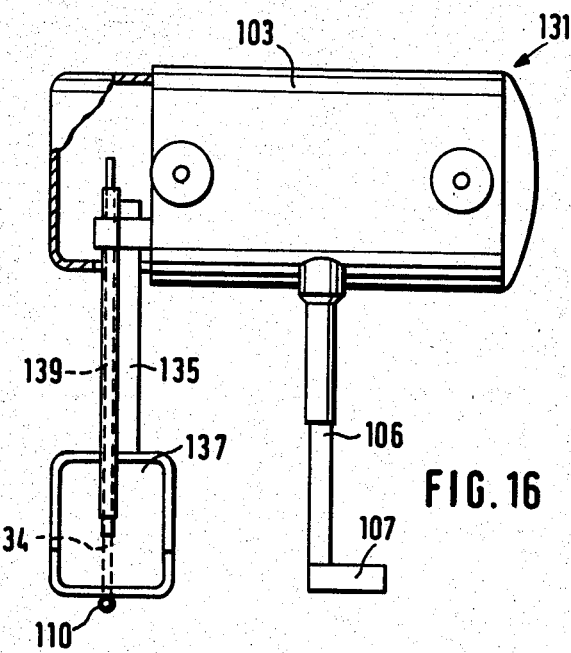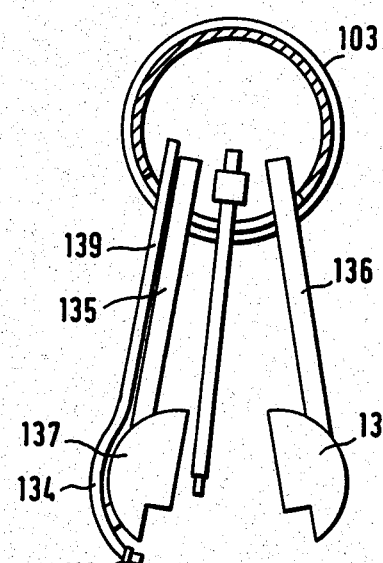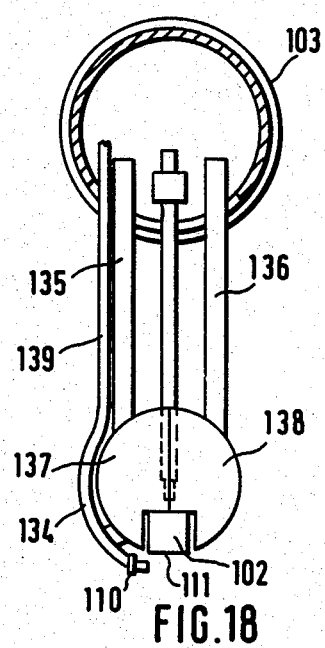

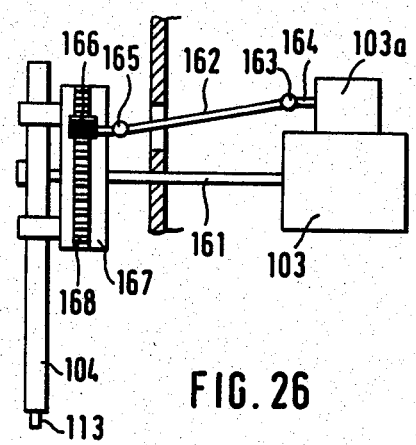
FIG. 26
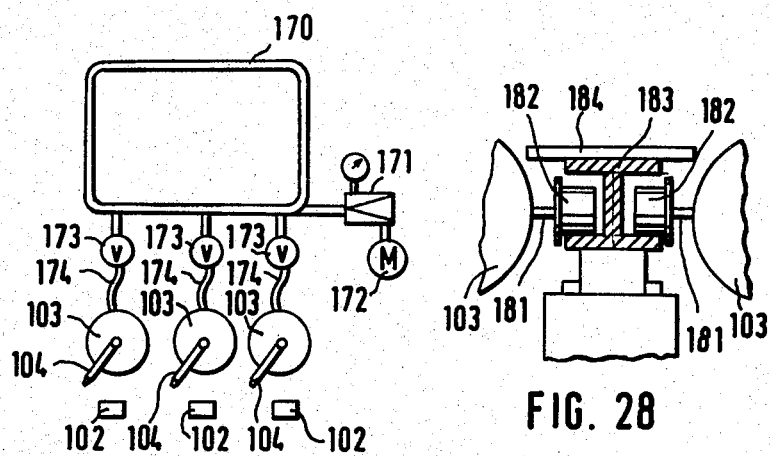
FIG. 27
FIG. 28

FLAME-CUTTING MACHINE

BACKGROUND OF THE INVENTION

The invention relates to a flame-cutting machine for dividing moving bars, particularly hot and cold billets, in continuous casting units during the casting operation, especially with long casting periods and thus increased thermal stresses, where the flame-cutting machine includes a double jacket all around it through which a cooling medium flows and in which the bearing eyes for the shafts of the rotors as well as the through tubes machine parts going out or penetrating into the body of the machine are supplied in the double jacket.

For such flame-cutting machines, the important requirement is to achieve a high reliability of operation with the lowest maintenance and replacement part expense, while in particular avoiding interferences due to the extreme thermal stress and the formation of slag accretions. The invention is based on achieving these aims, while giving attention to a favorable manufacturing cost and an economical operation.

Measures for solving this problem posed are characterised in the claims.

SUMMARY OF THE PRESENT INVENTION

Here the flame-cutting machine is distinguished in that the double jacket consists of two U-shaped shells arranged concentrically spaced apart from one another, where the branches of the inner shell extend further upward than the branches of the outer shell, in that a lengthwise closing plate runs from the end edge of the outer shell to the inner shell and in that on the end sides, end closing plates are provided and that the two U-shaped shells run out on the end sides as single or double shells which in the region of the end closing plate are closed off by the latter.

Further advantageous embodiments and further developments of the invention are distinguished by an open machine cooling system with the involvement of torches and clamping arms and also by a slag accretion removal unit and are directed toward measures for height adjustment, a ring circuit with a quick exhaust valve for pauses in cutting as well as an oxygen or gas operation of the attaching lever and a double rail for a common support.

The invention will be described in detail in the following on the basis of embodiment examples with reference to the annexed drawings.

IN THE DRAWINGS

FIG. 1 shows a flame-cutting machine with the double jacket according to the invention in a perspective representation;

FIG. 1a is a lateral representation, in a section, of the arrangement of double shells on the end sides;

FIG. 2 shows two flame-cutting machines with double jackets arranged side by side;

FIG. 3 shows an arrangement of driving shafts with transmission in a double jacket in a diagrammatic representation;

FIG. 4 shows a further development of the flame-cutting machine with drag cable turret;

FIG. 10 shows a hood with tong-like clamping levers which can be swung inward;

FIG. 11 shows a side view of a flame-cutting machine with a slag removing unit;

FIG. 12 shows a front view of a flame-cutting machine according to FIG. 11, seen in the continuous casting direction;

FIG. 13 shows a side view of a modified embodiment of a flame-cutting machine according to FIG. 11;

FIG. 14 shows a front view of the flame-cutting machine on FIG. 11, seen in the continuous casting direction, wherein the starting position is represented;

FIG. 15 shows a view corresponding to FIG. 14, which shows the torches in their final position according to the section;

FIG. 16 shows a further embodiment of the flame-cutting machine according to FIG. 13 with a noise-prevention hood;

FIG. 17 shows a front view of a flame-cutting machine according to FIG. 16, seen in the continuous-casting direction, wherein the open position of the noise-prevention hood is represented;

FIG. 18 shows a view corresponding to FIG. 17 which shows the noise-prevention hood in the closed state;

FIG. 26 shows a height-adjusting apparatus for the torch in a diagrammatic representation;

FIG. 27 shows a ring circuit for an installation with three flame-cutting machines;

FIG. 28 shows a partial view of an arrangement of two adjacent flame-cutting machines.

DETAILED DESCRIPTION OF A PREFERRED EMBODIMENT OF THE PRESENT INVENTION

Figure 5:
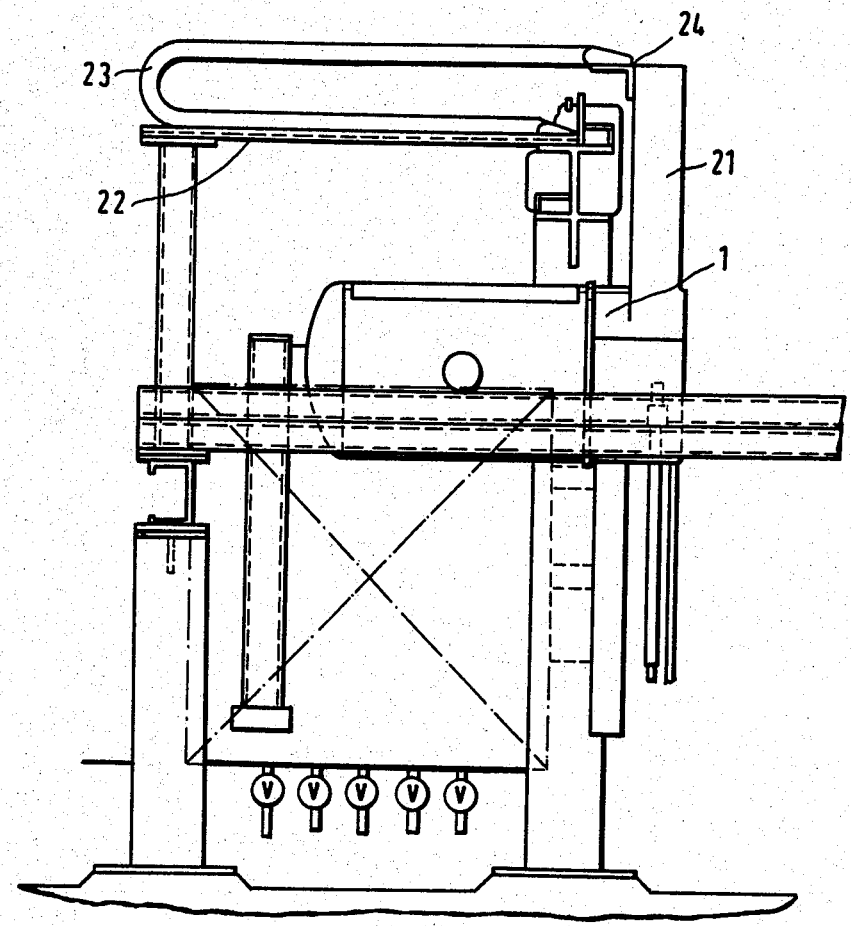
FIG. 5 shows a side view of a drag cable turret according to FIG. 4.

FIG. 1 in a perspective representation shows a double jacket 1 in which the sets of flame-cutting machines are located, where the double jacket has a coolant flowing therethrough. In this manner sufficient cooling is ensured during the casting operation, especially with long casting periods and thus increased thermal stresses. The double jacket 1 is provided with bearing eyes 2 through which the shafts of the rotors as well as passage tubes for machine parts going outward are welded in. The special feature of the double jacket 1 consists in that two concentrically arranged U-shaped shells 3 and 4 spaced apart from one another are provided, where the branches 5 of the inner shell 4 extend further upward than the branches 6 of the outer shell 3. From the end edge 7 of the outer shell 3, a lengthwise closing plate 8 extends to the inner shell 4, and the end sides are closed off by end closing plates 9 and 10. For this it can be provided that the two U-shaped shells 3 and 4 also run out on their end sides on double shells 13 and 14 which are closed by the plates in the region of the end closing plates 9 and 10, as is shown particularly in FIG. 1a. Depending on requirements, the double shells may be built convex or flat and the end side double shells 13 and 14 may also show a hemispherical shape. The branch 5 of the internal U-shaped shell 4 and the end closing plates 9 preferably end in a plane and are joined with a cover plate 11.

The form of the double jacket of the flame-cutting machine obtained thereby makes it possible, as will be explained in detail later, to solve the erection problem in a favorable way, and in particular, permits the close together arrangement of a plurality of sets of torches, which is permitted with the double jacket 1, and which causes the intermediate spaces 12 to widen upward, as FIG. 2 shows. In this manner a venturi effect is achieved, so that the flowing of the gas from the bottom up is facilitated, whereby the cooling effect is improved and in particular any heat buildup under the sets of torches is avoided. The diagrammatic representation in FIG. 3 shows how the drive shafts 15, 16 are guided outward by the bearing eyes 2, already mentioned, in the double jacket 1. By means of locking ring arangements 17, represented only diagrammatically, the assigned transmission and other driving units can be mounted or demounted in the double jacket 1. The locking rings 17 are removed in order to make it possible to release the stub shafts 15, 16 so that after the removal of the stub shafts 16 and 15 the driving units of the flame-cutting machine can be dismounted upward with a lifting of the cover plate 11. (FIG. 1) In this manner it is possible to carry out maintenance or to replace the units, whether this is required wholly or in part, without difficulty. Thus particular care is taken that when the cover plate 11 is removed, the elements are accessible for fastening the bearing shells and tightening the locking rings, so that no difficulties arise in releasing the elements. In particular, releasable couplings 19, 20 are also provided so as to be able without difficulty to remove machine parts such as the transmission 18 from the housing.

The advantages of the design of the double jacket 1 according to the invention are also revealed on the following development in that a drag cable turret 21 is mounted on the cover plate 11 or formed directly on the outer U-shaped shell 3, as is represented in FIG. 4. The drag cable turret 21 extends upward from the double jacket 1 in order to drive the energy-supplying cable 23 which runs over the flame-cutting machine in a cable trough 22. As is shown particularly in FIG. 5, the drag cable turret 21 is fastened on the double jacket 1 and can move beside the cable through 22 and parallel to the latter, where a driving arm 24 extending laterally is fastened onto the energy supplying cable 23 in order to move it with the double jacket 1 of the flame-cutting machine when this moves to the right along its common path in FIG. 5.

As FIG. 4 shows, a plurality of bars and also a plurality of flame-cutting machines with their double jacket 1 and the drag cable turret 21 located on it may be arranged side by side. FIG. 4 shows such a side-by-side arrangement of the double jackets 1 in a diagrammatic representation, but the arrangement may—as is seen with the development of the double jacket 1 and the intermediate space 12 formed thereby—be designed in such a way as is represented in FIG. 2.

Figure 6:
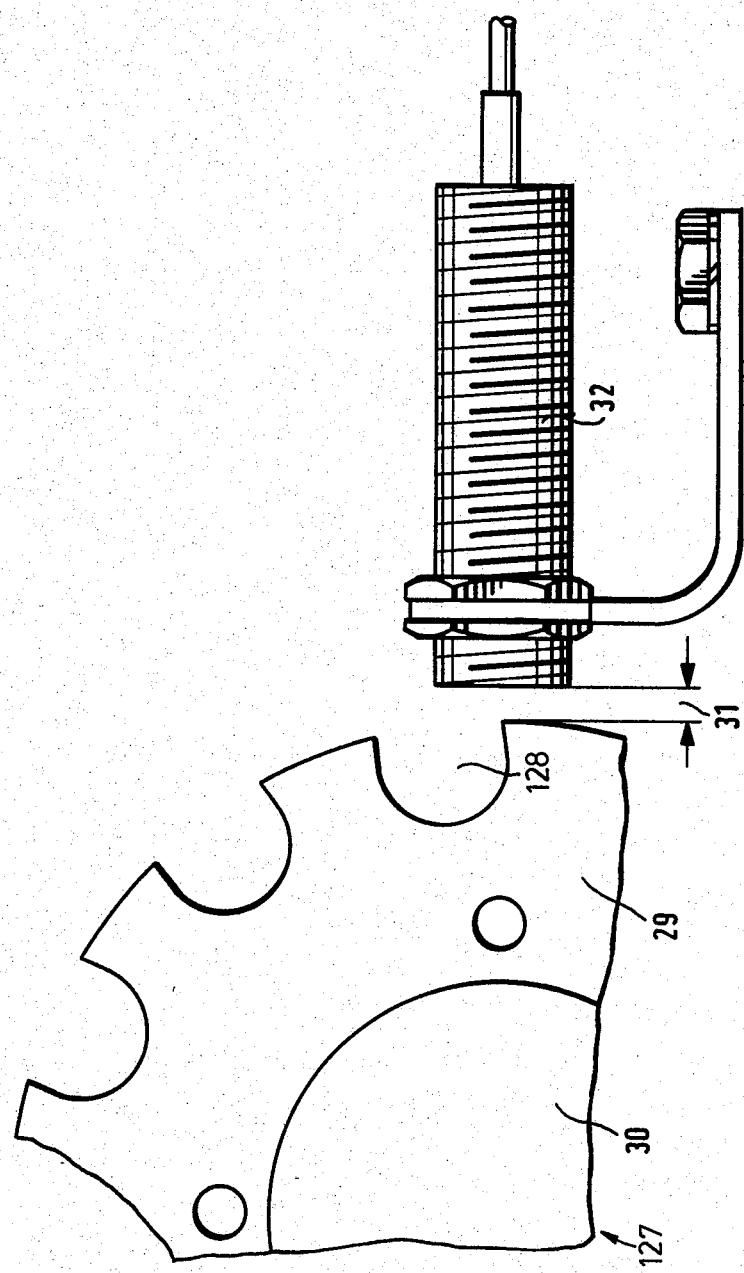
FIG. 6 shows a pulse generator-pulse counter arrangement on an enlarged scale.

As FIG. 4 further shows in a diagrammatic representation, an otherwise unrepresented edge control lever 25a with torch 26 is arranged on the end side, preferably on the end closing plate 9, next to the pair of clamping levers 25, and cuts apart the work piece 28 which is on the roller train 27. The torch 26 is mounted by way of a shaft 17 which extends through bearing eyes 2 of the double jacket 1, as has already been described. A pulse generator 127 is assigned to the arrangement of the edge control lever 25a with torch 26. As can be seen in detail in FIG. 6, the pulse generator 127 consists of a wheel 29 having notches 128 which wheel is seated on the shaft 30 of the torch 26. At a distance 31 of about 5 mm a pulse counter 32 with a built-in presetting unit is provided in order to control the torch operation subsequent to a scanning operation by the edge scanning lever 25a. The shaft part 30 acting on the pulse generator 127 by way of the notched wheel 29 can, if necessary, be provided with a high rotation speed as compared to that of the torch driving shaft 17 by means of a drive mechanism, not represented.

Figure 7:
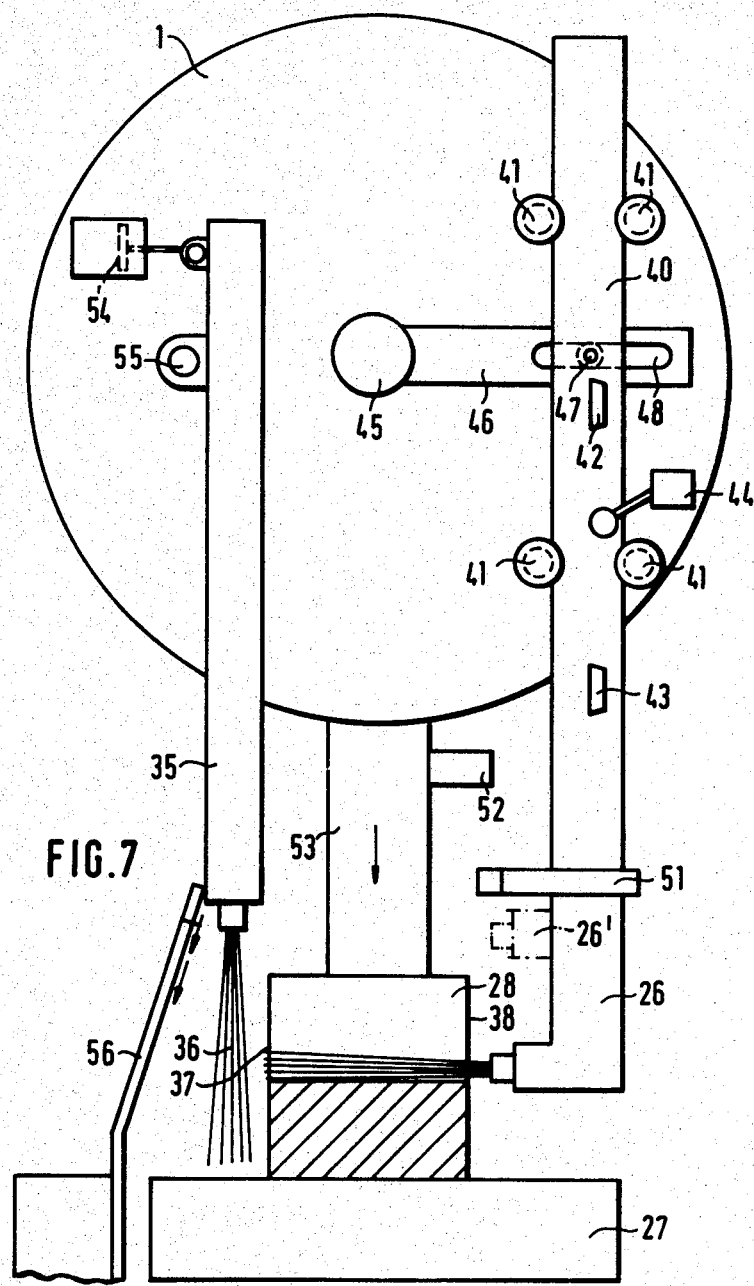
FIG. 7 shows a view of the end side of a double jacket with flame-cutting nozzle, and slag removal nozzles assigned to this slag.

On the end side 9 of the double jacket 1 not only a flame-cutting nozzle 26 but also a slag removing jet 35 (FIG. 7) can be assigned to this. As FIG. 7 shows, the slag removing nozzle 35 sends a jet 36 along the sides 37 of the work piece 28 which is located on the roller train 27 which is opposite the working side 38 of the flame-cutting torch. In this way the slags formed by the torch 26 on the side 37 during the cutting process are blown away downward by the jet 36 of the slag removal nozzle 35. On the torch shank 40, which is guided in guides 41, there is an upper catch 42 and a lower catch 43 which interact with the limit switch 44. The limit switch 44 actuates the torch driving shaft 45, which operates the torch shank 40 by way of a driving arm 46, which shank has an operating connection with the latter means of a bolt 47 which is located in an oblong hole 48 of the driving arm 46. With the aid of a sensing pin 51 which is placed on the torch shank and interacts with a stop 52 which is arranged on a bolt 53 which can be lowered onto the work piece 28, the starting position 26 of the torch 26 can be ascertained, which is represented in broken lines. If the torch 26 is in the starting position 26 represented in broken lines, the slag removal nozzle, by means of a cylinder-piston arrangement 54, is swung around the shaft 55 in the direction of the torch 26 in order to ignite the latter. Then the slag removal nozzle 35 swings back into its position represented in FIG. 7 in order to play the nozzle jet 36 on the surface 37 of the work piece 28 for removing the slag. The slags are blown downward between the work piece 28 and a baffle plate 56. The oxygen is fed in a suitable way to the cutting nozzle 26 and the slag removal or igniting nozzle 35 by means of a ring circuit, not represented. It is advantageous to provide that the flame-cutting nozzle 26 and the slag removing or igniting nozzle 35 show a common control element, so that the slag removal nozzle 35 in FIG. 7 is swung to the right in order to serve as igniting flame when the flame-cutter nozzle 26 assumes its starting position 26, whereas the slag removing nozzle 35 is automatically swung back into the position represented in FIG. 7 when the igniting operation has been done and the flame cutter 26 starts the cutting operation with a downward motion.

In its further development the slag removing nozzle 35 can be formed as a twin nozzle in order to remove the slags on the two parts of the work piece 26 separated by the cutting.

The flashing 56 which is provided on the side of the nozzle stream 36 of the slag removal nozzle 35 opposite the work piece 28 can be provided as part of a sound insulating hood.

Figure 8:
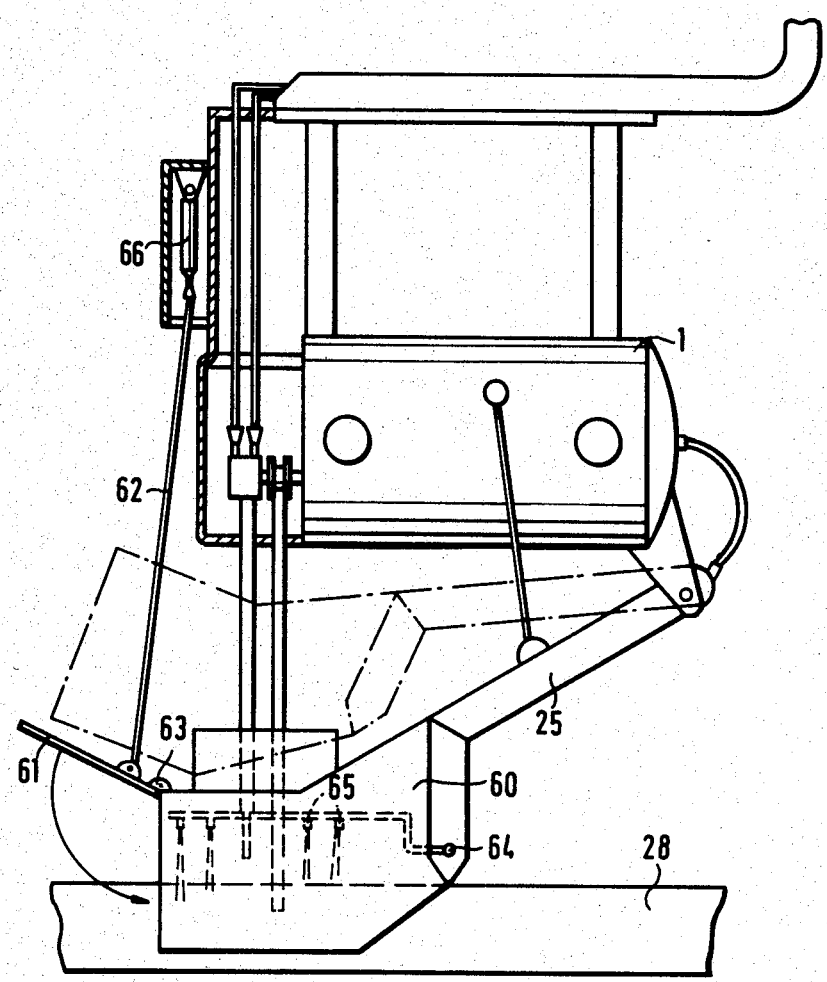
FIG. 8 shows a hood fastened onto the attaching lever for synchronous motion.

As FIG. 8 shows, a hood 60 made of rustproof material is fastened on the attaching lever 25. The hood 60 is covered with nonflammable sound insulating materials and is provided with a water spray, not represented. The hood 60 serves for sound insulation and/or for collecting fumes. Since the hood 60 is fastened onto the attaching lever 25 which can be raised and lowered, a synchronous motion is ensured, so that during the cutting operation the cutting region is enclosed. A viewing flap 61 is provided for the cutting control. This can be opened manually, by motor or pneumatically by means of a cable line 62 which raises the viewing flap 61 which is fastened to a hinge 63. If the attaching lever 25 is raised, then the hood 60 is raised with it and it then assumes the position shown in broken lines in FIG. 8 in which the whole work piece 28 is released. A spray water line 64 distributes water spray along the hood with nozzles 65 in order to counteract any damage due to extreme heat buildup. While in the hood 60 represented in FIG. 8 the viewing flap 61 frees a front opening, which is advantageous for compartments transverse over the billets, the viewing flap 61 can also be arranged laterally and there too it can be lifted by means of a cable line 62 with position cylinders 65.

Figure 9:
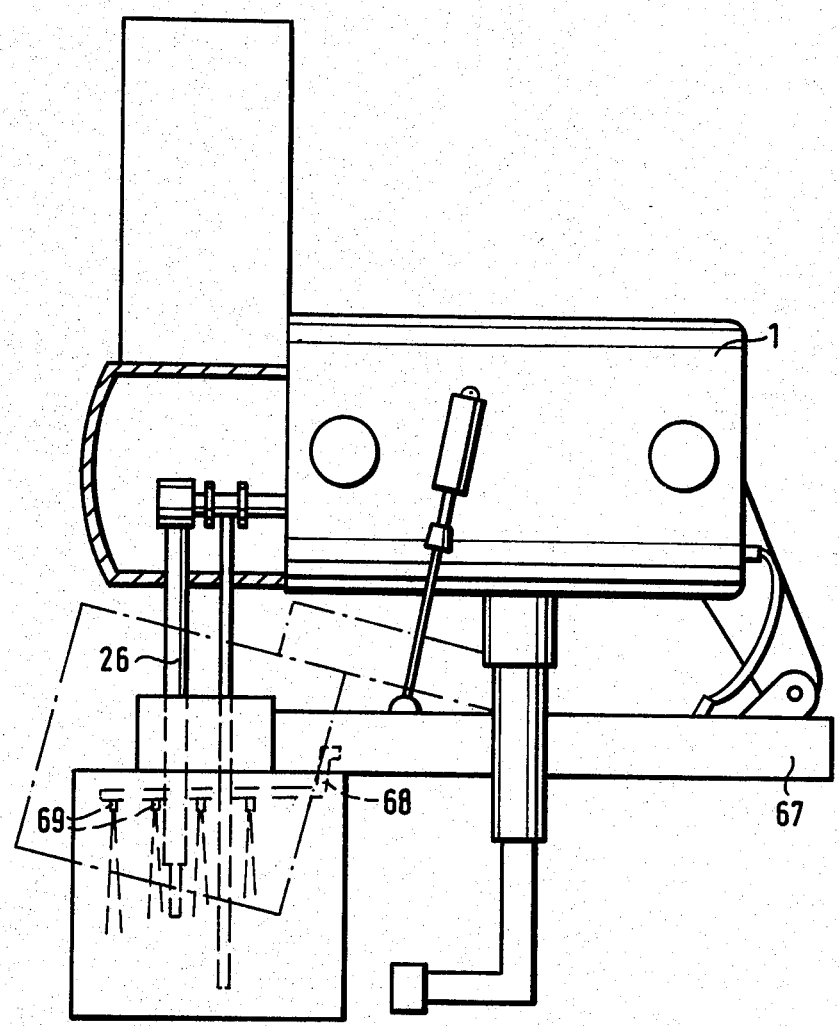
FIG. 9 shows a modified embodiment of a hood on a water-cooled lever which can be raised and lowered.

If an attached lever which can be raised and lowered is not available, it is also possible to place the hood on a separate lever 67. (FIG. 9) This lever is fastened onto the double jacket 1 of the flame-cutting machine and is preferably connected with the water cooling system of the latter. In this way the lever 67 itself undergoes a cooling, and here too the hood 60 is cooled by means of a corresponding feed line 68 with nozzles 69. Such a hood is represented in FIG. 9. The lever 67 can again be lifted by the use of a cable line 62 and a position cylinder 65, whereby the lever with the hood 60 moves into the position represented in broken lines in FIG. 9.

As FIG. 10 shows, a further embodiment consists in having the hood 60 divided into two parts and having the two hood parts 60a and 60b fastened on the clamping levers 25 which act in the manner of tongs. When the attaching levers swing in for their synchronous motion, the two hood parts 60a, 60b form a closed hood which as can be seen in FIG. 10, a water cooling system as well as a viewing flap are provided as in the foregoing embodiments.

FIG. 11 represents a flame-cutting machine 101 which serves for cutting up moving bars (FIG. 12), particularly billets. On the machine housing 103 a torch 104 is arranged on the end side and is pivoted swingably by means of a torch holder 105 so that it can execute a swinging motion going in the cutting direction, approximately at a right angle to the feed direction of the continuously cast bar 102. During this operation the flame-cutting machine 101 moves synchronously with the bar 102. This synchronous motion is represented by clamping arms 106 which with their clamping jaws 107 press against both sides of the cast bar 102 so that the flame-cutting machine 101 moves along with the cast bar 102. The burner 104 has a gas removing tube 109 assigned to it, which at its end, as FIG. 12 in particular shows, carries a slag removal nozzle 110. The slag removal nozzle is arranged approximately in the plane of the bottom face 111 of the cast bar 102, and the nozzle outlet 112 is located in about the region of the end face of the cast bar 102, so that the gas jet coming out of the slag removal nozzle 110 extends along the bottom face 111 of the cast bar 102. In particular the gas feed pipe 109 to the torch 104 runs up to the region behind the cutting nozzle 113 and from there, in a laterally projecting bend, runs into an end piece 115 which is in about the plane of the bottom face 111 of the cast bar 102 or else in a plane which is parallel to the bottom face 111 of the cast bar 102. The gas feed pipe 104 is fastened by means of clamps 116 onto the torch 104 so that it swings with the latter. The outlet end 112 of the slag removal nozzle 110 is then located approximately in an extension of the flame-cutting nozzle 113, as can be seen particularly from FIG. 12. In FIGS. 11 and 12 a front cover 117 is broken away for the purpose of a better representation of the arrangement of the torch 104 on the machine housing 103.

In FIG. 13 is represented a flame-cutting machine 121 which largely corresponds to the one shown in FIG. 11. Insofar as the same parts are present, these are designated with the corresponding reference numbers of FIGS. 11 and 12. On a machine housing 103, which executes a common motion with the cast bar with the aid of clamping arms 106 carrying clamping jaw 107, a gas feed pipe 129 is arranged laterally outside on the torch 104, and the laterally projecting bend 124 is shaped so that the outlet end 112 of the slag removal nozzle 110 ends in a longitudinal plane which is spaced apart from the extension of the flame-cutter nozzle 113. As FIG. 14 shows, at the start of the cutting operation the slag removal nozzle 110 is not encroached upon by the gas jet which emerges from the flame-cutter nozzle 113. A single drive, not represented, for the swiveling motion causes the torch 104 to move faster than the slag removal unit with the gas feed pipe 124, so that in its final position as represented in FIG. 15, after the cutting operation has been carried out, the slag removal nozzle 110 is situated slightly ahead of the cast bar 102, while the torch 104 with its flame-cutting nozzle 113 has assumed a position behind the cast bar 102.

In FIG. 16 a further embodiment 131 of the flame-cutting machine is represented. The machine housing 103 also has clamping arms 106 with clamping jaws 107 in order to hold the cast bar 102 fast. Swinging arms 135 and 136 are mounted on the machine housing 103, which arms on their lower end 102 carry noise prevention hood parts 137 and 138. (FIG. 17) On one swinging arm 135 is mounted a feed pipe 139 of the slag removal unit, which with its bend 134 extending laterally runs around the hood part 137 and at its end also carries the slag removal nozzle 110. In FIG. 17 the noise prevention hoods 137, 138 are represented in their opened position, and FIG. 18 shows the closed noise prevention hoods 137, 138 with the two halves closed up, that is, the two swinging arms 135, 136 have been swung together. In this position the slag removal nozzle 110 is again under the bottom face 111 of the cast bar 102 in a position where the gas stream coming out of the slag removal nozzle 110 extends along the bottom face 111 of the cast bar 102, so that any slag accretions forming on the bottom side are blown away. For this purpose slag baffle plates, not represented, may be arranged on the opposite side of the cast bar 102 from the slag removal nozzle 110.

Figure 19:
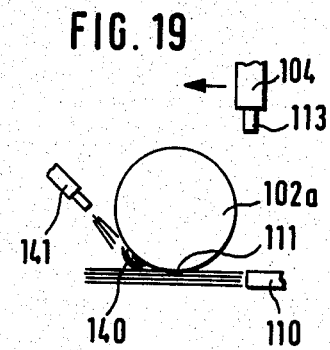
FIG. 19 shows a nozzle arrangement on a round work piece.

In FIG. 19 is represented a round continuously cast bar 12a which is being divided by a torch 104 with the cutting nozzle 113 by having the torch 104 move to the left in FIG. 19. In this way a slag accretion is formed on the bottom side of 111 of the cast bar 102a, which slag crystallizes on both sides of the cut gap on the pieces of the cast bar. The slag removal nozzle 110 puts out a gas stream which prevents such a formation of slag accretions by having the slags blown away or forced away. A slag accumulation 140 pushed upward is then formed. In order to prevent this, a counter-flow nozzle 141 is provided which forces the slag accumulation 140 downward, so that it goes back into the jet stream of the slag removing nozzle 110.

Figure 20:
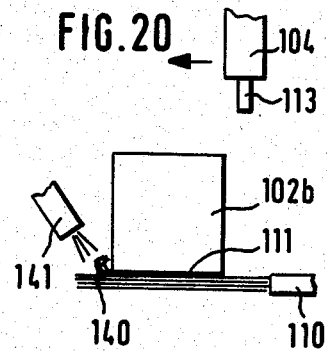
FIG. 20 shows a nozzle arrangement corresponding to FIG. 19, on a rectangular work piece.

FIG. 20 shows how in a similar way a slag accumulation 140 builds up on a rectangular cast bar on the side turned away from the slag removal nozzle. When the torch 104 moves to the left and the slag removing nozzle 110 on the bottom face of the cast bar 102b blows away the slags accumulating there, then, here too, at the same time the slag accumulation 140 will be blown by the counter-flow nozzle 141 back into the stream of gas issuing from the slag removal nozzle 110.

A gas stream is sent out in a broad band from the slag removal nozzle 110, consisting of air, oxygen or a fuel gas-oxygen mixture. In this way the slag removal action is not impaired when there are inaccuracies in the setting, since a broad band sweeps over the bottom face 111 of the cast bar 102a, 102b.

Figure 21:
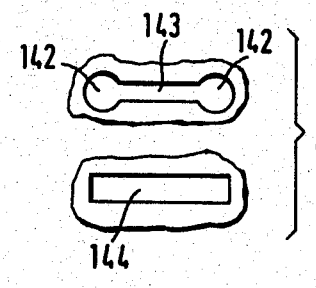
FIG. 21 shows views of nozzle outlets of a slag removing nozzle.

FIG. 21 represents the outlet profiles of the slag-removal nozzle 110. The slag-removal nozzle 110 may consist of two bored holes 142 which are connected by a slot 143 the width of which is less than the diameter of the holes 142. It is also possible for the slag removal nozzle 110 to consist simply of a slot 144 running transversely. A slag removal nozzle with a gas outlet cross section 6 mm wide and 26 mm long has proven good. Moreover it is also possible to form the slag removal nozzle 110 as a multiple-hole nozzle in which the gas goes through a large number of smaller gas outlet openings similar to a pepper shaker.

As can be seen from FIGS. 19 and 20, the counter-current nozzle 141 directs a stream of gas at an angle to the plane of the gas stream sent out by the slag removal nozzle. This angle is adjustable and depends on the operating conditions. In order to ensure keeping the slags fluid, the counter-current nozzle can serve for additional heating of the slag accumulation 40. Of course for this, the kinetic energy of the gas stream which the counter-flow nozzle sends out should be lower than the kinetic energy of the gas stream of the slag removal nozzle 110.

Figure 22:
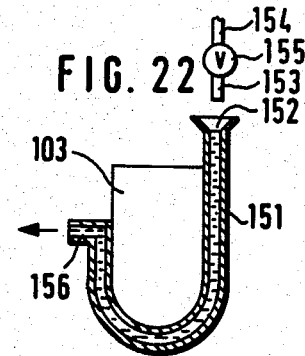
FIG. 22 shows the open cooling system of the flame-cutting machine in a diagrammatic representation.

An advantageous cooling of the flame-cutting machine is diagrammatically represented in FIG. 22. This involves an open machine cooling in which the machine housing 103 shows a double jacket 151. This double jacket has cooling water flowing through since the end 153 of a feed line 154 opens into an open water feed 152, which end is provided with a check valve 155. In this way no special expenditures are required for the feeding of cooling water, since a normal water line with check valve 155 supplies the double jacket 151 of the machine body 103 of the flame-cutting machine with cooling water. The under part of the cooling jacket 151 or the wall of the machine housing 103 is bent in order to facilitate the coolant flow to the coolant outlet 156.

Figure 23:
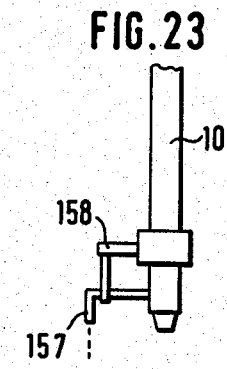
FIG. 23 shows torches incorporated into the open cooling system according to FIG. 22.
Figure 24:
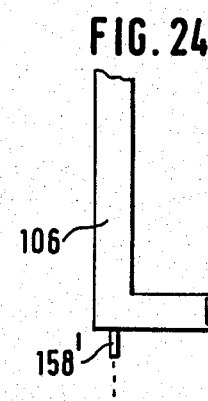
FIG. 24 shows a clamping lever incorporated into the open cooling system according to FIG. 22.
Figure 25:
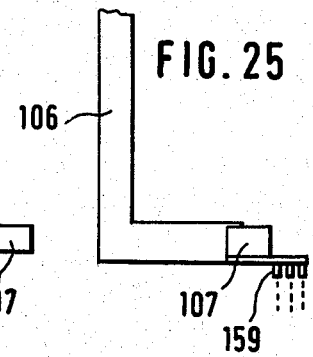
FIG. 25 shows a clamping lever according to FIG. 24 in a modified embodiment.

Other units can be connected to this open cooling system of the flame-cutting machine. FIG. 23 shows a torch 104 which is integrated into the machine cooling system of the flame-cutting machine housing 103, i.e. the coolant also flows through the torch 104 and flows out through a short outlet pipe 157 which is fastened by a holder 158 onto the torch 104. Thereby the outlet for the coolant coming out of the open machine cooling system can be arranged so that still other important parts situated outside the flame-cutting machine, in the roller table for example, can be cooled. In FIG. 24 is represented a clamping arm 106 which is likewise connected to the open cooling system of the machine housing 3. The water flows from the cooling jacket 151 through the clamping arm 106 which is made hollow and goes out through the outlet 158. As FIG. 25 shows, it is also possible for the outlet 159 for the cooling to be located in the vicinity of the clamping jaws 107.

By means of the open machine cooling system described, it is possible to regulate the flow of cooling water in the cooling jacket 151, for example, by suitable cross sections, so that the flow of cooling water is matched to the corresponding cooling requirements. Likewise the cooling water cavities are dimensioned so that a minimum reserve of coolant is ensured, so that during any transient interruption of the cooling water feed the flame-cutting machine and any units which it may be necessary to assign to it are sufficiently protected.

FIG. 26 shows a machine housing 103 of a flame-cutting machine from which a shaft 161 projects for driving the cutting motion of the torch 104 with the nozzle 113. A second height adjustment driving shaft 162 is connected at one end by way of a universal joint 163 with a driving shaft 164 extending out of the machine housing part 103a and at its other end by way of a universal joint 165 with the shaft of a gear 166 which is moved by a carriage guide 167 and meshes with a rack 168 seated in the latter, which rack in turn is connected with the torch. If a rotation is imparted to the gear 166 by way of the height adjustment driving shaft 162, then the torch 104 moves along the carriage guide 167 perpendicular with respect to the cast bar, not represented. The height adjustment driving shaft 162 can also be constructed as a flexible shaft, so that the universal joints become superfluous.

In FIG. 27 is represented a flame-cutting machine unit which shows three machine housings 103 which are provided with torches 104 in order to cut apart cast 102. By reasons of the ring circuit 170 represented in FIG. 27 for feeding the media required for the operation of the torch 104, separate regulators for each torch 104 are eliminated, since only one regulator 171 is required which is operated by a servomotor 172 by way of a remote control unit, not represented. In this way the torches 104 are controlled in common by the regulator 171 and the ring circuit 170. For the so-called pause cutting, in which the operation of the torch 104 must be interrupted immediately, quick-release valves 173 are provided in the cutting oxygen feed lines 174 shown which immediately evacuated the cutting oxygen feed lines 174 when stopping, so that the torch operation is instantly interrupted. While only one ring circuit 170 is represented in FIG. 27 for the cutting oxygen, the two other media—the heating oxygen and the heating gas—require ring circuits, so that in addition to a saving in regulators and servomotors for each medium, an economical remote control and automation are also achieved with the aid of the ring circuit. The regulator with its remote control can be arranged on the left or the right in accordance with the structural conditions. Also it is possible in a constructionally very suitable way for the ring circuits 170 to be integrated into the machine frame. Moreover, the oxygen feed for the slag removal or igniting nozzle can also be done by means of the ring circuit.

A corresponding control also makes it possible to use oxygen or heating gas for operating the clamping arms 106, in which case preferably a pneumatic cylinder, not represented, is provided between the clamping levers 106, and into which cylinder the cutting oxygen or the heating gas is introduced.

As is seen in FIG. 27, a plurality of machine housings 103 are often supported beside one another close together in a flame cutting installation. In order on the one hand to keep the space requirements as small as possible and on the other hand to permit passage through the installation between two machine housings 103, the supporting of two adjacent machine housings 103 on an H-beam 183 by way of their rotors 182 fastened on shafts 181 is shown in FIG. 28. While the rotors 182 are supported on the lower flange of the H-beam 183, the upper flange carries a walkway 184 which serves for passage through the installation. Railings, not represented, can be fastened onto the walkway 184.

I claim:

1. In a flame-cutting machine having at least one displacable cutting torch for dividing hot and cold billets, bloom and slab rods in continuous casting installations during the casting operation, particularly with long casting periods and thus increased thermal stresses, where the flame-cutting machine has a double jacket all around it through which a cooling medium flows and through which bearing eyes for shafts of rotors as well as through tubes for machine parts going out or penetrating into the body of the machine are welded into the double jacket, the improvement comprising the double jacket (1) having two U-shaped shells (3, 4) arranged concentrically spaced apart from one another, with branches (5) of the inner shell (4) extending further upward than the branches (6) of the outer shell (3), a lengthwise closing plate (8) extending from the end edge (7) of the outer shell (3) to the inner shell (4) and end closing plates (9, 10) on the end sides.

2. The flame-cutting machine as claimed in claim 1 and further comprising a short open inlet pipe (152) into which cooling water flows from a cooling water feed line (153, 154), a short open drain pipe (156) from which cooling water leaves the cooling jacket cavity (151), and open machine cooling means for torch cooling including means for fluidly coupling water from the cooling jacket (151) to channels (157) on the torch (104) and means for fluidly coupling water from the cooling jacket (151) to clamping arms (106) built hollow and having an outlet in the region of the end (158, 159) of the clamping arms (106), wherein the flow of the cooling water is advantageously regulated by suitable cross sections and the cooling water cavities include means to retain a minimum reserve of coolant so that the flame-cutting machine is protected in the event of any interruption in the cooling water feed.

3. The flame-cutting machine as claimed in claim 1 and further comprising a drag cable turret (21) mounted on the double jacket (1) and extending upward from the jacket in order to carry along with it the energy-supplying cable (23) guided in a cable trough (22), and means for moving the drag cable turret (21) beside the cable trough (22) and parallel to the trough and moving the energy-supplying cable (23) by way of a laterally extending carrying arm (24).

4. The flame-cutting machine as claimed in claim 1 and further comprising a main driving shaft, a pulse generator arranged on the main driving shaft for the torches (26) which controls the cutting process in cooperation with an edge control lever (25a), wherein the pulse generator is provided with a presetting unit having means for controlling the flame-cutting operation in response to a scanning operation done by the edge-scanning lever (25a) and wherein the pulse generator interacts with a rotating shaft part (30).

5. A flame-cutting machine as claimed in claim 1, and further comprising a first cutting motion driving mechanism and a second height adjusting driving mechanism (103a) provided in the machine housing (103), each driving mechanism having separate driving shafts (161, 162) extending out of the housing (103, 103a) to the torches (104), and wherein the shaft (161) for the cutting motion driving mechanism is fixed and carries on its end the torch (104) with a carriage guide (167) for height adjustment, and wherein the shaft (162) for the height adjustment driving mechanism includes a gear (166) on its end opposite the driving mechanism (103a), which gear engages in a rack (168) which is fastened onto the carriage guide (167) of the torch (104) and wherein the shaft (162) for the height adjustment driving mechanism is constructed as a flexible shaft (163, 165).

6. A flame-cutting machine as claimed in claim 1 and further comprising a ring circuit (170) for each medium to be fed, such as cutting oxygen, heating oxygen and heating gas, including a circuit supply line (174) for each individual torch (104) each circuit supply line being coupled to a common regulator (171) in the feed line to the ring circuit (170).

7. A flame-cutting machine as claimed in claim 1 and further comprising means for pneumatically operating the clamping arms (106), wherein said pneumatic means comprises a pneumatic cylinder extending between the clamping arms (106) and means for introducing cutting torch gases into the cylinder.

8. A flame-cutting machine as claimed in claim 1 and further comprising a plurality of machine housings (103), double rails (183) on which the rotors (182) of adjacent machine housings (103) run in common, and webs (183) running upward in the center of the double rails (183) supported between the rotors (183), wherein the webs carry a walkway (184) for passing through the flame-cutting machines.

9. A flame-cutting machine as claimed in claim 1 and further comprising a hood (69) fabricated from rust-proof material, and covered with noncombustible sound insulating material.

10. A flame-cutting machine as claimed in claim 9 and further comprising means for spraying water within said hood.

11. A flame-cutting machine as claimed in claim 9 wherein said hood is constructed of two parts.

12. A flame-cutting machine as claimed in claim 9 and further comprising means for displacing said hood to enclose the flame-cutting region during a cutting operation, and including a lever and means for water cooling said lever.

13. A flame-cutting machine as claimed in claim 9 wherein the hood comprises a viewing flap (61) and means for opening said flap.

14. A flame-cutting machine as claimed in claim 1, and further comprising means for removing slag accretion extending from the machine housing (103) to the cast bar (102), which means comprises a gas feed pipe (109, 129, 139) and a slag removal nozzle (110) at the end of the gas feed pipe, wherein the slag removal nozzle (110) is substantially aligned with the plane of the bottom side of the cast bar and the nozzle outlet (112) of the slag removal nozzle (110) ends substantially at the region of the side face of the cast bar (102), in such a way that the gas stream coming out of the slag removal nozzle (110) extends along the bottom face (111) of the cast bar (102).

15. A flame-cutting machine as defined in claim 14 wherein the slag removal nozzle includes two bored holes (142) which are connected by a slot (143) the width of which is less than the diameter of the bored holes (143).

16. A flame-cutting machine as claimed in claim 14 wherein the slag removal nozzle is built as a multiple-hole nozzle with a large number of gas outlets.

17. A flame-cutting machine as claimed in claim 14 wherein the slag removal nozzle (110) has a counter-flow nozzle (114) assigned to it substantially aligned with a plane angled with respect to the cutting jet of the flame-cutting nozzle (113), which counter-flow nozzle suppresses the slag accumulation (140) and prevents a shifted slag accretion (140) from forming outside of the flow plane of the slag removal nozzle (110).

18. A flame-cutting machine as defined in claim 14 wherein the slag removal nozzle includes a slot running transversely.

19. A flame-cutting machine as claimed in claim 17 wherein the slag removal nozzle (110) sends out a gaseous stream in a broad band so that the setting accuracy of the slag removal action is not impaired and whereby the counter-flow nozzle serves for additional heating of the slags (140) and thereby for keeping them fluid.

20. A flame-cutting machine as defined in claim 18 wherein the slot has a width of 6 mm and a length of 26 mm.

* * * * *

UNITED STATES PATENT AND TRADEMARK OFFICE
CERTIFICATE OF CORRECTION

PATENT NO. : 4,527,777
DATED : July 9, 1985
INVENTOR(S) : Horst K. Lotz

It is certified that error appears in the above-identified patent and that said Letters Patent is hereby corrected as shown below:

Column 5, line 25 after "distributes" delete "water spray"

and insert --spray water--.

Column 5, line 55 after "bars" insert --102--.

Signed and Sealed this

Twenty-ninth Day of October 1985

[SEAL]

Attest:

Attesting Officer

DONALD J. QUIGG

Commissioner of Patents and
Trademarks—Designate

UNITED STATES PATENT AND TRADEMARK OFFICE
CERTIFICATE OF CORRECTION

PATENT NO. : 4,527,777
DATED : July 9, 1985
INVENTOR(S) : Horst K. Lotz

It is certified that error appears in the above–identified patent and that said Letters Patent are hereby corrected as shown below:

In the patent heading, Item [30], line 2, delete "Nov. 9, 1982" and insert --Sept. 11, 1982--.

Signed and Sealed this

Twenty-sixth Day of August 1986

[SEAL]

Attest:

Attesting Officer

DONALD J. QUIGG

Commissioner of Patents and Trademarks